(12) United States Patent
Descarries

(10) Patent No.: US 8,107,724 B2
(45) Date of Patent: Jan. 31, 2012

(54) METHOD AND SYSTEM FOR PREDICTIVE SCALING OF COLOUR MAPPED IMAGES

(75) Inventor: Simon Descarries, Sherbrooke (CA)

(73) Assignee: Vantrix Corporation, Montreal, Quebec (CA)

( * ) Notice: Subject to any disclaimer, the term of this patent is extended or adjusted under 35 U.S.C. 154(b) by 762 days.

(21) Appl. No.: 12/185,081

(22) Filed: Aug. 2, 2008

(65) Prior Publication Data

US 2010/0027877 A1 Feb. 4, 2010

(51) Int. Cl.
*G06K 9/00* (2006.01)
*G06K 9/36* (2006.01)

(52) U.S. Cl. ........................... 382/162; 382/166

(58) Field of Classification Search ........................ None
See application file for complete search history.

(56) References Cited

U.S. PATENT DOCUMENTS

| | | |
|---|---|---|
| 4,509,043 A | 4/1985 | Mossaides |
| 4,654,720 A | 3/1987 | Tozawa |
| 4,907,075 A | 3/1990 | Braudaway |
| 5,119,186 A | 6/1992 | Deacon |
| 5,181,014 A | 1/1993 | Dalrymple |
| 5,418,895 A | 5/1995 | Lee |
| 5,696,539 A | 12/1997 | Welti |
| 6,937,759 B2 | 8/2005 | Ridge |
| 2002/0057446 A1* | 5/2002 | Long et al. ............. 358/1.13 |
| 2007/0005795 A1* | 1/2007 | Gonzalez ................ 709/232 |
| 2008/0196076 A1* | 8/2008 | Shatz et al. ............. 725/116 |

* cited by examiner

*Primary Examiner* — Vu Le
*Assistant Examiner* — Kenny Cese
(74) *Attorney, Agent, or Firm* — Victoria Donnelly; IP-MEX Inc.

(57) ABSTRACT

A method for scaling an original color mapped image are disclosed. The method performs steps of: transforming the original color map into the scaled color map based on the original color map and the original image independently of the scaled image; scaling the original image into the scaled image; for each pixel of the scaled image: determining a set of contributing pixels in the original image, which define a color of the pixel; determining the color of the pixel based on colors of the contributing pixels and geometric proximity of the pixel to the contributing pixels; establishing correspondence between the color of the pixel and a color in the scaled color map; and determining a corresponding color map index thereof; and setting the determined color map index in the scaled pixel map. A corresponding system for scaling digital images is also provided.

25 Claims, 6 Drawing Sheets

METHOD AND SYSTEM FOR PREDICTIVE SCALING OF COLOUR MAPPED IMAGES

FIELD OF THE INVENTION

The present invention relates to scaling of digital images, and in particular, to a method and system for predictive scaling of colour mapped images.

BACKGROUND

Processing of images is a time consuming and CPU intensive procedure because of the shear volume of data to be processed and complexity of algorithms involved.

For this reason, various methods of reducing both the volume of data and the complexity of the image processing algorithms have been developed.

One of the methods relies on reducing the number of distinct colours used to produce an image, even at the expense of the image quality. Instead of storing and managing every primary colour component of every pixel of the image, the most representative colours are grouped into a limited size array of colour elements, in which each element (a colour) is indexed by its position. Such array of colour elements, representing a positive trade off between the number of colours in the set and the image quality, is customarily referred to as a colour map of the image. This way, the pixels of the image contain not the full colour components but merely their index into the colour map and are often referred to as a pixel map of the image. Thus, an image structurally organized into a colour map and a pixel map is called the colour mapped image.

For many applications, colour mapped images are preferred over other types of images, since they are smaller in size and simpler to process, while maintaining an acceptable perceived visual quality.

However, for some applications, such as transformation of images, best known in the art as scaling, benefits provided by colour mapped images are still insufficient. The need for performing scaling may arise, for example, when the size of a high-quality original image exceeds the display or memory capabilities of a mobile device, particularly when a number of images are streamed in a video sequence. In this case, pixels of the image that do not fit into a smaller display must be dropped, which may result in an unacceptable loss of quality of the image because of the lower resolution and no longer adequate colour map. To minimize the damage caused by scaling, prior art suggests to perform a computationally intensive procedures, such as re-generation of the colour map of the scaled image.

However, prior art seems to overlook many opportunities for further minimization of image processing arising during scaling of colour mapped images.

Correspondingly, it is desirable and advantageous to develop an improved method and system for scaling a colour mapped digital image, which would reduce the computational intensity of image processing.

SUMMARY OF THE INVENTION

Accordingly, there is an object of the invention to provide an improved method and system for scaling of colour mapped images, which would avoid or mitigate the shortcomings of the prior art.

According to one aspect of the invention, there is provided a method of scaling an original image, having an original colour map and original pixel map, into a scaled image having a scaled colour map and a scaled pixel map, the method comprising steps of:

(a) transforming the original colour map into the scaled colour map based on the original colour map and the original image independently of the scaled image;
(b) scaling the original image into the scaled image;
(c) for each pixel of the scaled image:
  (i) determining a set of contributing pixels in the original image, which define a colour of the pixel;
  (ii) determining the colour of the pixel based on colours of the contributing pixels and geometric proximity of the pixel to the contributing pixels; and
  (iii) establishing correspondence between the colour of the pixel and a colour in the scaled colour map; and determining a corresponding colour map index thereof; and
  (iv) setting the determined colour map index in the scaled pixel map.

The step (a) comprises computing a number of colours N in the original colour map, excluding transparent colours.

In the method as described above, the transforming comprises re-using the original colour map as the scaled colour map provided $N > N_{max}$.

In the method described above, the step of transforming comprises:
  (v) increasing the number of colours available in the original colour map to produce the scaled colour map provided $N < N_{min}$.

Beneficially, the step of the transforming further comprises:
  (vi) selecting a sub-set of colours, available in the original colour map, for colour enhancement; increasing the number of colours for the selected sub-set of colours; and
  (viii) removing duplicate colours obtained in the step (vii); provided $N_{min} < N < N_{max}$.

Conveniently, the step (v) comprises:
generating combinations of any two colours from the original colour map;
for each combination, interpolating between said two colours.

In the embodiment of the invention, the step (vi) comprises:
selecting a number of colours $M_s$ in the sub-set of colours according to the following:

$M_s = N$, provided $N(N+1) \leq 2N_{max}$;

$M_s = M$, where M is the smallest number $M < N$ for which $M(M-1) \geq 2(N_{max} - N)$, provided $N(N+1) > 2N_{max}$;

wherein N is a number of colours in the original colour map, and $N_{max}$ is a predetermined maximum number of colours.

In the method described above, the step (vii) comprises:
generating combinations of any two colours from the sub-set of colours;
for each combination, interpolating between said two colours.

For an image in a video stream, the step (b) comprises scaling only a delta region of the original image, i.e. the region of the original image that has been changed compared to a previous frame in the video stream.

In the method described above, the step (ii) comprises:
assigning the colour of the pixel equal to the colours of the contributing pixels provided the colours of the contributing pixels are the same; or
assigning the colour of the pixel by interpolating colours between the contributing pixels.

Beneficially, the interpolating colours between the contributing pixels comprises bi-linear interpolating.

For bi-linear interpolation, the step (i) of the method comprises determining first ($Q_{11}$), second ($Q_{12}$), third ($Q_{21}$) and fourth ($Q_{22}$) contributing pixels located in vertices of a rectangle surrounding the pixel ($P_1$) and having respective colours $f(Q_{11})$, $f(Q_{12})$, $f(Q_{21})$ and $f(Q_{22})$; and wherein the step(ii) comprises determining the colour $f(P_1)$ of the pixel ($P_1$) as follows:

$$f(P_1)=f(Q_{11})(x_2-x)/(x_2-x_1)+f(Q_{21})(x-x_1)/(x_2-x_1)$$

provided $f(Q_{11})=f(Q_{12})$ and $f(Q_{21})=f(Q_{22})$ and wherein x is a horizontal coordinate of the pixel $P_1$, $x_1$ is a horizontal coordinate of the pixels $Q_{11}$ and $Q_{12}$, and $x_2$ is a horizontal coordinate of the pixels $Q_{21}$ and $Q_{22}$.

Alternatively, for the bi-linear interpolation, the step (i) of the method may comprise determining first ($Q_{11}$), second ($Q_{12}$), third ($Q_{21}$) and fourth ($Q_{22}$) contributing pixels located in vertices of a rectangle surrounding the pixel (Q) and having respective colours $f(Q_{11})$, $f(Q_{12})$, $f(Q_{21})$ and $f(Q_{22})$; and wherein the step (ii) comprises determining the colour $f(Q)$ of the pixel ($P_1$) as follows:

$$f(P_1)=f(Q_{11})(y_2-y)/(y_2-y_1)+f(Q_{12})(y-y_1)/(y_2-y_1)$$

provided $f(Q_{11})=f(Q_{21})$ and $f(Q_{12})=f(Q_{22})$ and wherein y is a horizontal coordinate of the pixel $P_1$, $y_1$ is a horizontal coordinate of the pixels $Q_{11}$ and $Q_{21}$, and $y_2$ is a horizontal coordinate of the pixels $Q_{12}$ and $Q_{22}$.

Conveniently, the step (iii) of the method comprises finding the closest match in the scaled colour map.

According to another aspect of the invention, there is provided a system for scaling an original image, having an original colour map and original pixel map, into a scaled image having a scaled colour map and a scaled pixel map, the system comprising:
- a computer having a processor and computer readable medium having computer readable instructions stored thereon for execution by the processor for forming the following:
- a colour map transformation module for transforming the original colour map into the scaled colour map based on the original colour map and the original image independently of the scaled image;
- a pixel selection module for scaling the original image into the scaled image;
- a colour interpolation module for determining, for each pixel of the scaled image:
  (i) a set of contributing pixels in the original image, which define a colour of the pixel;
  (ii) the colour of the pixel based on colours of the contributing pixels and geometric proximity of the pixel to the contributing pixels; and
- a colour map index generation module for:
  (iii) establishing correspondence between the colour of the pixel and a colour in the scaled colour map; and determining a corresponding colour map index thereof; and
  (iv) setting the determined colour map index in the scaled pixel map.

In the system described above, the colour map transformation module further comprises a colour map analyzer module for determining a number of colours N in the original colour map, and comparing the number of colours N with a predetermined thresholds Nmin and Nmax.

The colour map transformation module further comprises a colour culling module for selecting a sub-set of colors available in the original color map, which are most beneficial for colour enhancement, provided Nmin<N<Nmax.

The colour map transformation module further comprises a colour map enhancement module for increasing the number of colours available in the original colour map to produce the scaled colour map provided N<Nmax, and for increasing the number of colours in the selected sub-set of colours provided Nmin<N<Nmax, and for removing duplicate colours.

The colour map enhancement module comprises means for generating combinations of any two colours from the original colour map; and for each combination, interpolating between said two colours.

The colour culling module comprises means for selecting a number of colours $M_s$ in the sub-set of colours according to the following:

$M_s = N$, provided $N(N+1) \leq 2N_{max}$;

$M_s = M$, where M is the smallest number M<N for which $M(M-1) \geq 2(N_{max}-N)$, provided $N(N+1) > 2N_{max}$;

wherein N is a number of colours in the original colour map, and $N_{max}$ is a predetermined maximum number of colours.

In the system as described above, the colour culling module further comprises means for:
- determining a colour usage vector indicating frequency of use of colours in the original colour map;
- generating an octree graph based on the colour usage vector;
- parsing the octree graph to select $M_s$ colours to be included in the sub-set.

A computer readable medium having computer readable instructions, stored thereon for execution by a processor to perform the steps of the method described above, is also disclosed.

Beneficially, the original and scaled images are Graphical Interchange Format (GIF) images. Alternatively, the images may be encoded with Portable Network Graphics (PNG) formats, Bitmap (BMP), or other image formats using colour maps.

Thus, an improved method and system for scaling colour mapped images have been provided.

BRIEF DESCRIPTION OF THE DRAWINGS

Embodiments of the invention will now be described, by way of example, with reference to the accompanying drawings, in which.

DETAILED DESCRIPTION OF THE EMBODIMENTS OF THE INVENTION

The preferred embodiment of the present invention takes an advantage of opportunities for minimizing the processing of colour mapped images arising during the transformation of one colour mapped image into another, such as scaling of the image.

Figure 1:
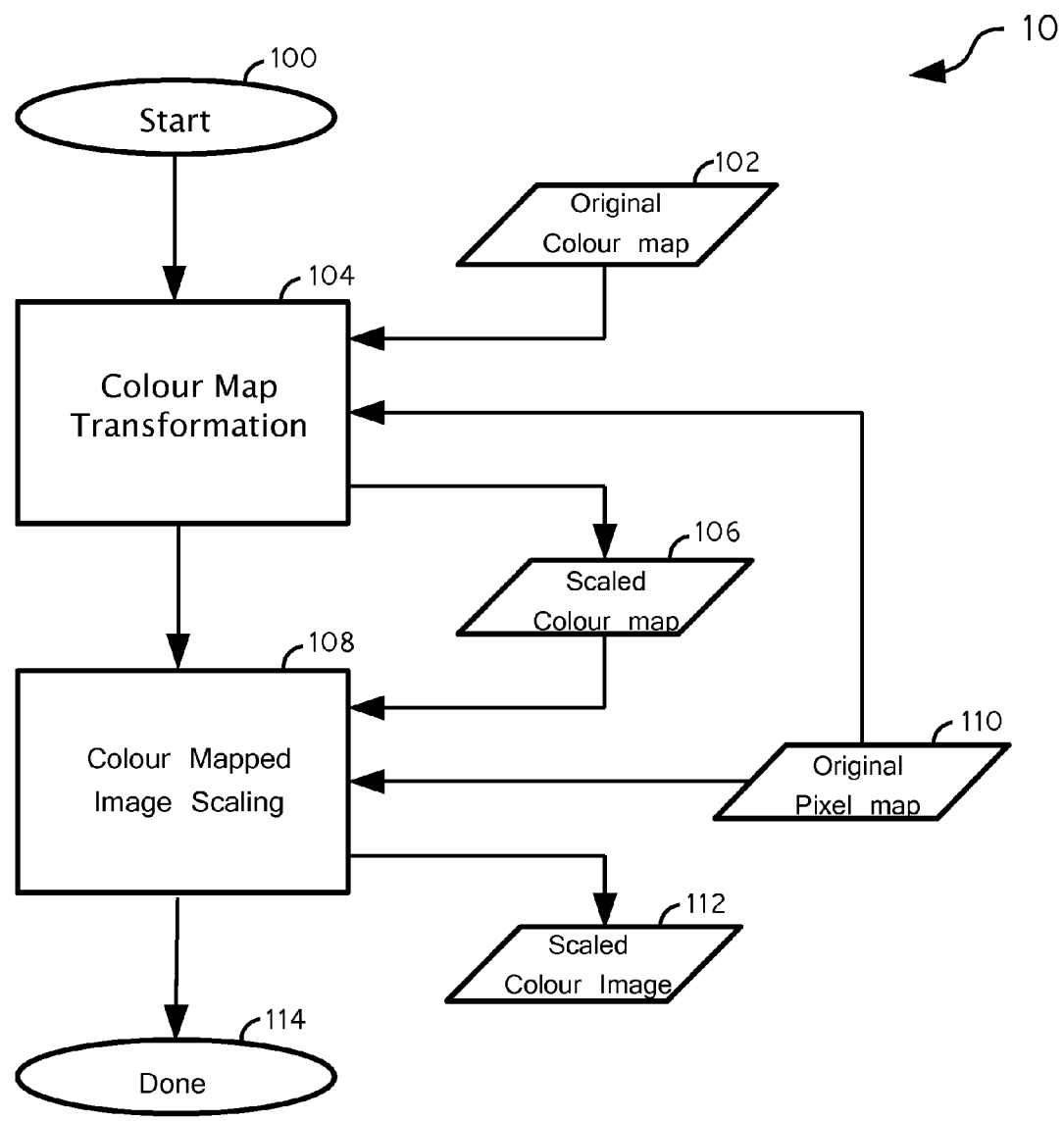
FIG. 1 illustrates the steps of the method for scaling a colour mapped image according to the embodiment of the present invention.

FIG. 1 shows a flow-chart 10 illustrating the method for scaling a colour mapped image of the embodiment of the present invention. The method 10 starts at block 100. At block 104 (Colour Map transformation), an original colour map 102 is modified into a scaled colour map 106, based on the analysis of each pixel in the pixel map 110 of the original image against its colour map index to determine the most frequently used colours of the original image. Afterwards, block 108 (Colour Mapped Image Scaling) performs scaling of the original image by using the original pixel map 110 and the scaled colour map 106 as input to the block 108 to produce scaled colour map image 112 having scaled colour map and scaled pixel map (not shown in FIG. 1). The method terminates at block 114.

The purpose of the block Colour Map Transformation 104 is to transform the original colour map so as to make it resemble the colour map of the scaled image without performing a computationally intensive quantization of the scaled image. Instead of the quantization, the method of the embodiment of the present invention performs the steps shown in more detail with regard FIG. 2.

The colour map transformation procedure 20 starts at block 200, followed by determining whether or not the original colour map 102 needs to be transformed. This accomplished by counting the number of colours N, i.e. colours used in the original colour map, excluding a transparent colour (block 204), and analyzing its value (block 206). The transparent colour is handled separately. Our research shows that for N exceeding a predetermined maximum number of colours $N_{max}$, i.e. $N>N_{max}$, the original colour map can be effectively re-used as the scaled colour map without modifications. A reasonable value for $N_{max}$ has been determined to be 16, but there may be other circumstances where other values of the $N_{max}$ maximum number of colours would be beneficial. If it is determined to be the case (exit "false" from block 206), the scaled colour map 230 is defined in step 228 as a copy of the original colour map 102, and the procedure 20 stops at step 232.

However, if $N<N_{max}$, the number of colours N is considered to be insufficient for maintaining an acceptable quality of the scaled image, and therefore the transformation of the original colour map is further required (exit "true" from block 206). Quality of the transformation substantially depends on the choice of colours to be transformed, which, in turn, depends on the number of colours N. Analysis of N is performed in block 208. For N smaller than a predetermined minimum number of colours $N_{min}$, i.e. $N<N_{min}$ (exit "false" from block 208), all colours in the original colour map are selected in block 210 for further transformation. A reasonable value for $N_{min}$ has been determined to be $N_{min}=4$, however, there may be other circumstances where other values of the minimum number of colours would be beneficial. Otherwise (exit "true" from block 208), i.e. when the number of colours N being greater than $N_{min}$, but smaller than $N_{max}$, only a sub-set of colours is selected, the colours in the sub-set being the most beneficial for the transformation of the original colour map. To determine which colours to select, each pixel of the original image is analyzed (block 212) against its colour map index to determine the most frequently used colours. In this analysis, actual colour values are not processed. Instead, a value of a pixel in the original pixel map (block 110) serves as a direct index for a colour usage vector of N integer values, each value representing the frequency of use of the corresponding colour. Each time the match is determined, the value of the colour usage vector corresponding to the direct index is incremented (block 216).

When all pixels of the original pixel map 110 are processed, the colour usage vector populates an octree graph in block 218. The octree graph includes nodes arranged in levels, and each node holds 8 values, each level corresponding to a colour component bit depth from most to least significant bits. For example, the most significant bits of the red, green and blue components of a color are combined to form a 3 bit index in the first node of the octree graph. Each following bits are indexed the same way into the deeper levels of the tree. This is a very efficient way to classify the colors. Each node must hold a value for the proportion of the whole image. When a colour entry is added to the tree, its usage increments the proportion value of each node it traverses.

Let us consider an exemplary color with the RGB components $RGB(132_{10}, 26_{10}, 87_{10})$, which is used 21% of the whole input image. The subscript 10 indicates the decimal representation of the corresponding value of the RGB component. In binary representation, the RGB components are $RGB(10000100_2, 00011010_2, 01010111_2)$, correspondingly. The RGB components in binary representation fill the R, G, and B sub-columns of the column "Color" of Table 1 shown below. At each depth, bits of the RGB components form bit patterns that are translated into the indices. For example, at depth 0, the exemplary color bit pattern is $100_2$, which translates into the index $4_{10}$. The value of the index determines the number of the sub-column of the column "Octree Indexing" of Table 1, intersection of which with the row of table 1 corresponding to depth 0 indicates the cell to fill in with the value of the exemplary color usage, i.e. 21%.

TABLE 1

| | | | | | | | | | | | | |
|---|---|---|---|---|---|---|---|---|---|---|---|---|
| | | | | | Octree indexing | | | | | | | |
| | Color | | | | Octree Indexing | | | | | | | |
| Depth | R | G | B | Index | 0 | 1 | 2 | 3 | 4 | 5 | 6 | 7 |
| 0 | 1 | 0 | 0 | 4 | | | | | 21% | | | |
| 1 | 0 | 0 | 1 | 1 | | 21% | | | | | | |
| 2 | 0 | 0 | 0 | 0 | | | | | | | | |
| 3 | 0 | 1 | 1 | 3 | | | | 21% | | | | |
| 4 | 0 | 1 | 0 | 2 | | | 21% | | | | | |
| 5 | 1 | 0 | 1 | 5 | | | | | | 21% | | |
| 6 | 0 | 1 | 1 | 3 | | | | 21% | | | | |
| 7 | 0 | 0 | 1 | 1 | 21% | | | | | | | |

From a quick overview we see that the branch 4 of the first node holds 21% of all colours in the image.

When all values of the colour usage vector are used to populate the octree graph, the number of colours $M_s$ selected for inclusion in the sub-set of the most beneficial colours is determined in block 220. $M_s$ is chosen according to the following rules:

Rule 1: If $N(N+1) \leq 2N_{max}$, then $M_s=N$.
Rule 2: If $N(N+1) > 2N_{max}$, then $M_s=M$, where M is the smallest number $M<N$ for which $M(M-1) \geq 2(N_{max}-N)$.

If Rule 2 is applicable, $M_s$ can be easily found in closed form, if desired. Indeed, the following theorem holds true:

Theorem

Let N and $N_{max}$ be natural numbers such that $N<N_{max}$ and $N(N+1)>2N_{max}$. Let [x] be the integer part of x, and $E(x)=[x]$ if x is a natural number, otherwise $E(x)=[x]+1$.

The smallest natural number $M=m<N$ for which $m(m-1) \geq 2(N_{max}-N)$ can be determined as $$M = E\left(\frac{1}{2} + \frac{1}{2}\sqrt{1 + 8(N_{max} - N)}\right)$$

Proof.

Inequality $m(m-1) \geq 2(N_{max}-N)$ becomes $m^2 - m - 2(N_{max}-N) \geq 0$ after simple algebra. Solving $M^2 - M - 2(N_{max}-N) = 0$ for M, we arrive at two roots $$M_{1,2} = \frac{1}{2} \pm \frac{1}{2}\sqrt{1 + 8(N_{max} - N)}$$

The inequality $m^2 - m - 2(N_{max}-N) \geq 0$ can be satisfied only by values of M bigger then the positive root $$m_1 = \frac{1}{2} + \frac{1}{2}\sqrt{1 + 8(N_{max} - N)}$$

$M=E(m_1)$, since M must be a natural number.

Hence, $$M = E\left(\frac{1}{2} + \frac{1}{2}\sqrt{1 + 8(N_{max} - N)}\right).$$

Let us consider two examples illustrating calculation of $M_s$ in case of $N_{max}=16$.

EXAMPLE 1

Let the number of colours used in the original colour map be N=4.

In this case, $(\frac{1}{2})N(N+1)=(\frac{1}{2})4(4+1)=10$.

Since 10<16, rule 1 is applicable, resulting in $M_s=N$ or $M_s=4$.

Thus, four colours must be selected for inclusion into the sub-set.

EXAMPLE 2

Let the number of colours used in the original colour map be N=9.

In this case, $(\frac{1}{2})N(N+1)=(\frac{1}{2})9(9-1)=36$.

Since 36>16, rule 2 is applicable. According to the Theorem above, we will get $$M = E\left(\frac{1}{2} + \frac{1}{2}\sqrt{1 + 8(16 - 9)}\right), \text{ or } M = E\left(\frac{1}{2} + \frac{1}{2}\sqrt{57}\right),$$

which yields M=E(4.27)=5, resulting in $M_s=5$.

Thus, five colours must be selected for inclusion into the sub-set.

When the number of the colours $M_s$ in the sub-set is determined, the octree graph is parsed from node to node to select the most beneficial colours. For example, if 16 colours are needed, each selected colour is required to be used by at least 6% of all pixels. The octree graph is parsed until we find nodes which meet the requirement. If a node isn't a leaf (full colour), then the resulting colour is calculated by averaging each of the node's child entries by their corresponding proportion.

The selected colours form the sub-set of colours of the original colour map, which are considered to be the most beneficial for performing the transformation of the original colour map.

Since the transformation of the sub-set is performed in block 222 via interpolating selected colours by averaging colours in each pair of neighbouring colours in the sub-set of colours, the resulting $$\frac{1}{2}M_s(M_s - 1)$$

new colours are added to the already present N colours. Red, green, and blue components of each pair are averaged independently of each other. Thus, the total number of colours after the interpolation is determined to be $$M_t = N + \frac{1}{2}M_s(M_s - 1).$$

The total number of colours after the interpolation $M_t$ may exceed the $N_{min}$ number of colours. If that is the case (exit "true" from block 224), the colours after the interpolation are checked for duplicate colours, which are subsequently removed in block 226 to ensure that the remaining colours are unique. The scaled colour map 106 is defined in block 228 as the colours generated in block 226. If the total number of colours after the interpolation $M_t$ in block 222 is smaller than $N_{min}$ (exit "false" from block 224), then the scaled colour map 106 includes all colours generated in block 222. The transformation of the original colour map stops in block 232.

Figure 3:
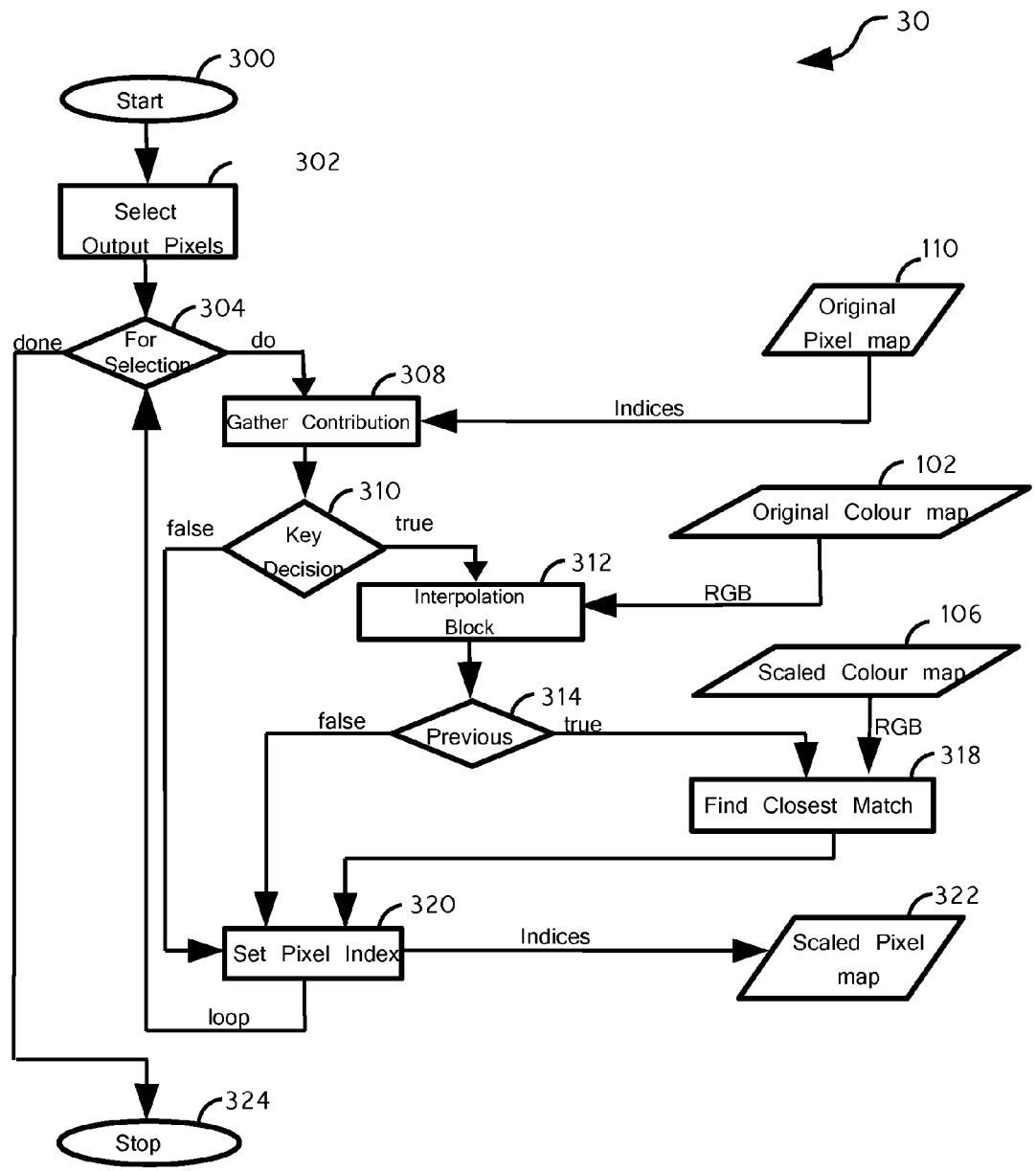
FIG. 3 shows the block 108 (Colour Mapped Image Scaling) of the method of FIG. 1 in more detail.

FIG. 3 shows a diagram 30 expanding the operation of the block 108 (Colour Mapped Image Scaling) of FIG. 1 in more detail.

It is known that image encoding formats like Graphic Interchange Format (GIF) support region optimization, and most encoded GIF animations are region optimized. We intend to take advantage of the readily available region optimization to reduce the number of pixels processed during scaling of the original image. For this purpose, upon start (block 300), the size of the displayable area of the mobile device is compared with the size of the original image to determine the required scale ratio. This scale ratio is applied to the optimized region parameters to determine the selection of pixels for the scaled image (block 302). Further processing is required to determine which colours from the scaled colour map 106, generated in advance in the step 104 of FIG. 1, should be assigned to each pixel in the selection.

For each pixel (block 304) selected in block 302 (exit "do" from block 304), steps outlined in blocks 308 to 320 are performed, unless all selected pixels are processed (exit "done" from block 304). For each pixel, a set of contributing pixels in the original image is determined (block 308) based on the original pixel map (block 110). The colour of each pixel depends upon colours of the contributing pixels, and is determined either by interpolating Red, Green, Blue (RGB) values of the contributing pixels (exit "true" from block 310), or skipping the interpolation entirely (exit "false" from block 310) depending on the analysis of the colours of the contributing pixels performed in block 310.

In the embodiment of the present invention, the bi-linear interpolation is used (block 312), but it is contemplated that there may be other circumstances where other interpolation techniques would be beneficial.

Figure 4:
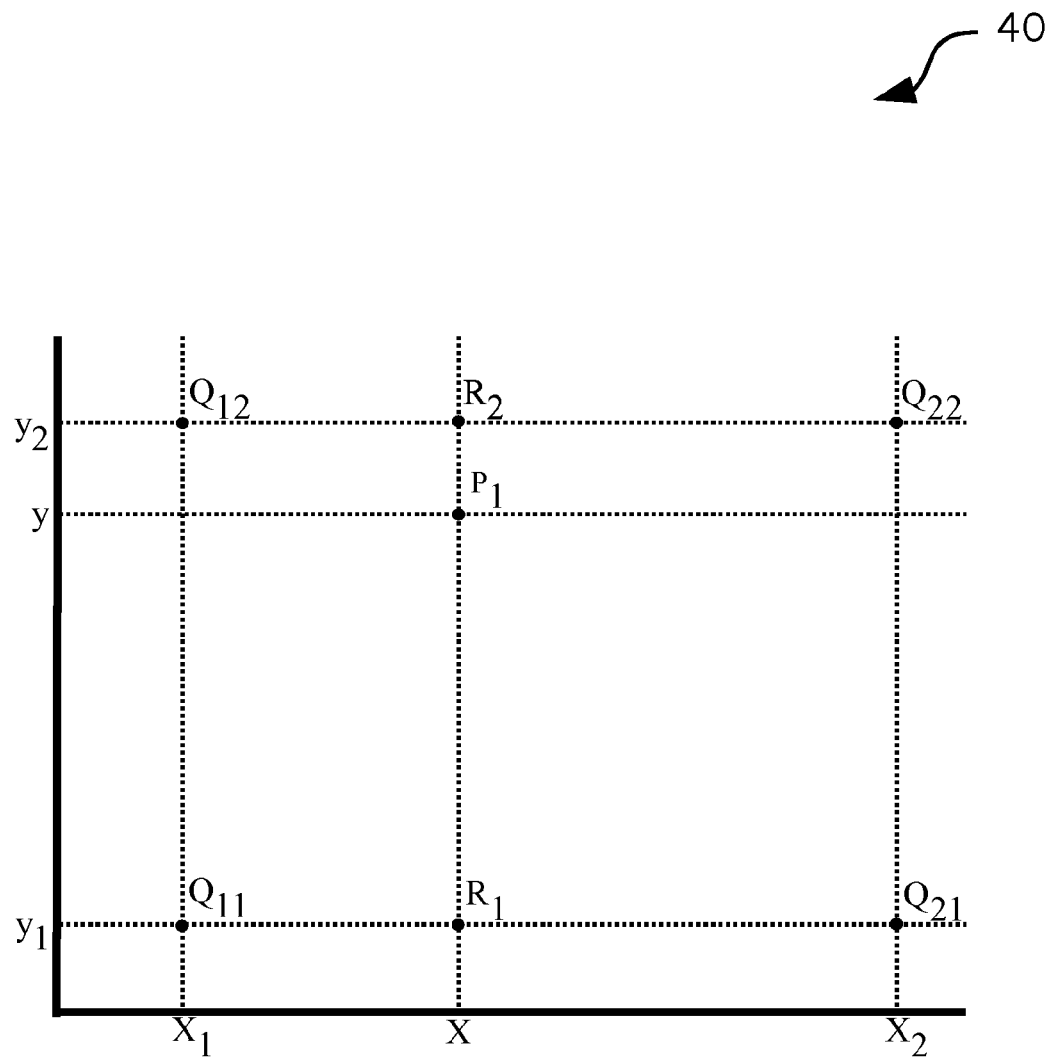
FIG. 4 is a schematic illustration of bi-linear interpolation performed in block 312 and the analysis of colours of the contributing pixels performed in block 310 of FIG. 3.
Figure 5:
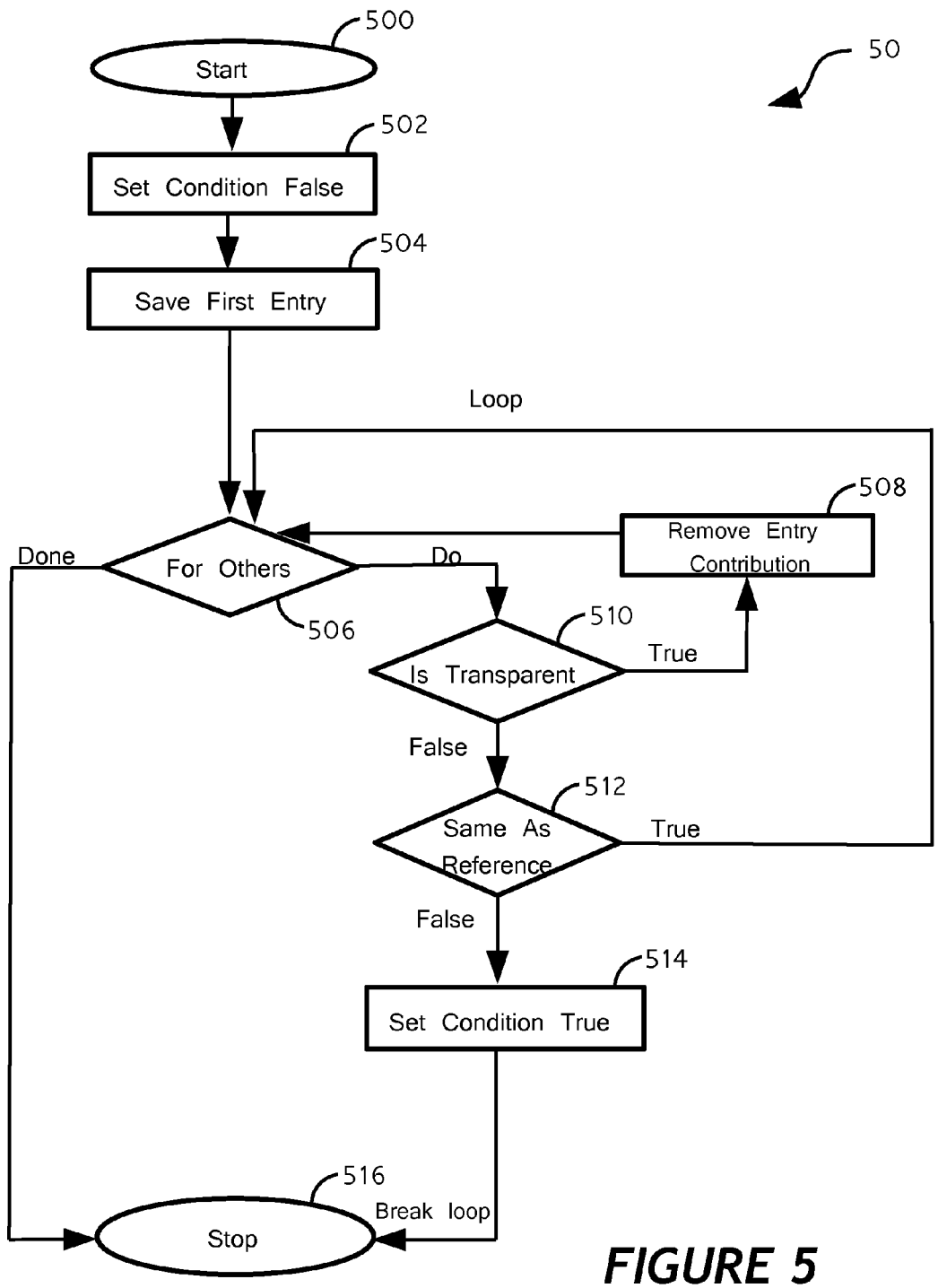
FIG. 5 shows the block 310 (Key Decision) of FIG. 3 in more detail.

Before proceeding with further details of the procedure 30 describing the operation of the block 108 (Colour Mapped Image Scaling), we'll make a detour to FIGS. 4 and 5 to illustrate the operation of blocks 312 and 310 in more detail.

Let us denote a pixel of the scaled image as $P_1$, and the corresponding contributing pixels of the original image as $Q_{11}$, $Q_{12}$, $Q_{21}$, and $Q_{22}$, as shown on diagram 40 of FIG. 4. Each of the $P_1$, $Q_{11}$, $Q_{12}$, $Q_{21}$, and $Q_{22}$ pixels is characterized by its respective RGB values, which are denoted here collectively as $f(P_1)$, $f(Q_{11})$, $f(Q_{12})$, $f(Q_{21})$, and $f(Q_{22})$, respectively. Pixels $Q_{11}$, $Q_{12}$, $Q_{21}$, and $Q_{22}$, are gathered in step 308 shown on FIG. 3 and form the list of contributing pixels further analyzed in step 310. The analysis is directed towards determining whether or not $f(Q_{11})$, $f(Q_{12})$, $f(Q_{21})$, and $f(Q_{22})$ satisfy the following condition:

$$f(Q_{11})=f(Q_{12})=f(Q_{21})=f(Q_{22}) \quad (1)$$

If condition (1) applies, then the interpolation simplifies into the following:

$$f(P_1)=f(Q_{11})$$

which means that the common colour of the contributing pixels $Q_{11}$, $Q_{12}$, $Q_{21}$, and $Q_{22}$, is assigned to the pixel $P_1$ in the selection.

Let us prove this statement.

Indeed, in its most general form, bi-linear interpolation is performed according to the following expression:

$$f(P_1) = f(Q_{11}) \cdot \frac{(x_2-x)(y_2-y)}{(x_2-x_1)(y_2-y_1)} + f(Q_{21}) \cdot \frac{(x-x_1)(y_2-y)}{(x_2-x_1)(y_2-y_1)} + f(Q_{12}) \cdot \frac{(x_2-x)(y-y_1)}{(x_2-x_1)(y_2-y_1)} + f(Q_{22}) \cdot \frac{(x-x_1)(y-y_1)}{(x_2-x_1)(y_2-y_1)} \quad (2)$$

where x,y are the coordinates of $P_1$, and $x_i,y_j$ are coordinates of $Q_{ij}$ (i=1,2; j=1,2).

Since $f(Q_{11})=f(Q_{12})=f(Q_{21})=f(Q_{22})$, we can factor the common multiple $f(Q_{11})$ out of the brackets $$f(P_1) = f(Q_{11})\left\{\frac{(x_2-x)(y_2-y)}{(x_2-x_1)(y_2-y_1)} + \frac{(x-x_1)(y_2-y)}{(x_2-x_1)(y_2-y_1)} + \frac{(x_2-x)(y-y_1)}{(x_2-x_1)(y_2-y_1)} + \frac{(x-x_1)(y-y_1)}{(x_2-x_1)(y_2-y_1)}\right\}$$

Adding fractions in the curly brackets and simplifying the resulting expression, we will arrive finally to $$f(P_1)=f(Q_{11}) \quad (3)$$

A schematic illustration of the steps of analyzing the list of contributing pixels is shown with the reference to diagram 50 of FIG. 5. Upon start (block 500), it is assumed that condition (1) is satisfied, which results in setting a special "interpolate" indicator to "false" (block 502). The entries in the list of contributing pixels are checked to find the first non-transparent entry, which is saved in block 504 as a reference entry for other conditions. The entries in the list of the contributing pixels are also checked in block 506 to find the last entry. If the last entry has been found (exit "done from block 506), processing of the list of contributing pixels is stopped in block 516. Otherwise (exit "do" from block 506), the processing of the list proceeds to block 510. If colour is the contributing pixel is transparent (exit "True" from block 510), the entry contribution is removed from the list in block 508, since the transparent colour is handled separately. Otherwise (exit "False" from block 510), the current entry is compared in block 512 with the reference entry saved in block 504. If both entries are the same (exit "True" from block 512), the steps 506 to 512 are repeated. Otherwise (exit "False" from block 512), the "interpolate" indicator is set to "true" in block 514, and the analysis of the remaining entries is stopped (block 516), since condition (1) is clearly not satisfied.

Referring back to FIG. 3, we'll continue describing the procedure 30 with block 310, resuming the analysis of the colours of the contributing pixels.

In the most favorable case, the list of contributing pixels is exhausted without changing the default value of the "interpolate" indicator, which allows the image processing to skip the interpolation block 312 (exit "false from block 310) and proceed directly to block 320 for setting the colour of the pixel $P_1$ according to the expression (3) shown above.

However, if the default value of the "interpolate" indicator has been changed to "true" (exit "true" from block 310), the step of interpolation 312 is performed. The list of contributing pixels is again analyzed (block 312) to determine whether or not $f(Q_{11})$, $f(Q_{12})$, $f(Q_{21})$, and $f(Q_{22})$ satisfy one of the following conditions:

$$f(Q_{11})=f(Q_{12}) \text{ and } f(Q_{21})=f(Q_{22}) \quad (4)$$

$$f(Q_{11})=f(Q_{21}) \text{ and } f(Q_{12})=f(Q_{22}) \quad (5)$$

If condition (4) applies, then the interpolation expression (2) simplifies into the $$f(P_1) = f(Q_{11}) \cdot \frac{x_2-x}{x_2-x_1} + f(Q_{21}) \cdot \frac{x-x_1}{x_2-x_1}$$

Let us prove this statement.

Indeed, substituting $f(Q_{11})$ instead of $f(Q_{12})$ and $f(Q_{21})$ instead of $f(Q_{22})$ into (2), we will get $$f(P_1) = f(Q_{11}) \cdot \frac{(x_2-x)(y_2-y)}{(x_2-x_1)(y_2-y_1)} + f(Q_{21}) \cdot \frac{(x-x_1)(y_2-y)}{(x_2-x_1)(y_2-y_1)} + f(Q_{11}) \cdot \frac{(x_2-x)(y-y_1)}{(x_2-x_1)(y_2-y_1)} + f(Q_{21}) \cdot \frac{(x-x_1)(y-y_1)}{(x_2-x_1)(y_2-y_1)}$$

After rearranging the order of the second and third terms, we will arrive to $$f(P_1) = f(Q_{11}) \cdot \left( \frac{(x_2-x)(y_2-y)}{(x_2-x_1)(y_2-y_1)} + \frac{(x_2-x)(y-y_1)}{(x_2-x_1)(y_2-y_1)} \right) + f(Q_{21}) \cdot \left( \frac{(x-x_1)(y_2-y)}{(x_2-x_1)(y_2-y_1)} + \frac{(x-x_1)(y-y_1)}{(x_2-x_1)(y_2-y_1)} \right)$$

Adding fractions in the brackets and simplifying the resulting expressions, we will get $$f(P_1) = f(Q_{11}) \cdot \frac{(x_2-x)(y_2-y+y-y_1)}{(x_2-x_1)(y_2-y_1)} + f(Q_{21}) \cdot \frac{(x-x_1)(y_2-y+y-y_1)}{(x_2-x_1)(y_2-y_1)}$$

Canceling "y" yields $$f(P_1) = f(Q_{11}) \cdot \frac{(x_2-x)(y_2-y_1)}{(x_2-x_1)(y_2-y_1)} + f(Q_{21}) \cdot \frac{(x-x_1)(y_2-y_1)}{(x_2-x_1)(y_2-y_1)}$$

and simplifying both fractions, we'll obtain $$f(P_1) = f(Q_{11}) \cdot \frac{x_2-x}{x_2-x_1} + f(Q_{21}) \cdot \frac{x-x_1}{x_2-x_1} \quad (6)$$

Similarly, if condition (5) applies, then the interpolation expression (2) simplifies into the $$f(P_1) = f(Q_{11}) \cdot \frac{y_2-y}{y_2-y_1} + f(Q_{12}) \cdot \frac{y-y_1}{y_2-y_1} \quad (7)$$

The proof is similar in all respects to the proof of the previous statement and therefore is not presented here.

The interpolation based on expressions (6) or (7) is much simpler than the interpolation based on general expression (1), it requires less memory and fewer processor cycles to compute, and therefore, when applicable, allows speeding up the process of interpolation considerably. For contributing pixels that do not satisfy either of conditions (4) and (5), interpolation is performed by using the expression (2). However, for GIF images, it is anticipated that the majority of pixels to be interpolated will fall within the category of pixels satisfying the condition (1), and therefore little interpolation needs to occur.

As a result of interpolation performed in block 312, the RGB values of the pixel $P_1$ are determined by using the original colour map 102, and we proceed to determining the colour map index of the resulting colour. Colour mapping is known to be computationally intensive procedure, since it involves computing the euclidean distance between the resulting colour and all colours in the colour map with the goal to find the closest match. In the embodiment of the invention, the number of pixels, for which colour mapping is actually performed, is minimized. It is achieved by comparing, in block 314, the resulting RGB values with those of the previous pixel either from the current frame or from the previous frame, if appropriate. If the RGB values match (exit "false" from block 314), the index of the previous pixel is applied directly to the pixel $P_1$ (block 320) without performing the colour map search. Otherwise (exit "true" from block 314), the colour map search is performed in block 318 to find the closest match by using the scaled colour map 106, and apply the corresponding index to the pixel $P_1$.

As soon as the colour map index of the pixel is determined, it is recorded in block 320 in the colour map of the scaled image. All steps are repeated for the next pixel of the scaled image starting from step 304 until all pixels are processed to form the scaled pixel map (block 322). The procedure 30 terminates in block 324.

Figure 6:
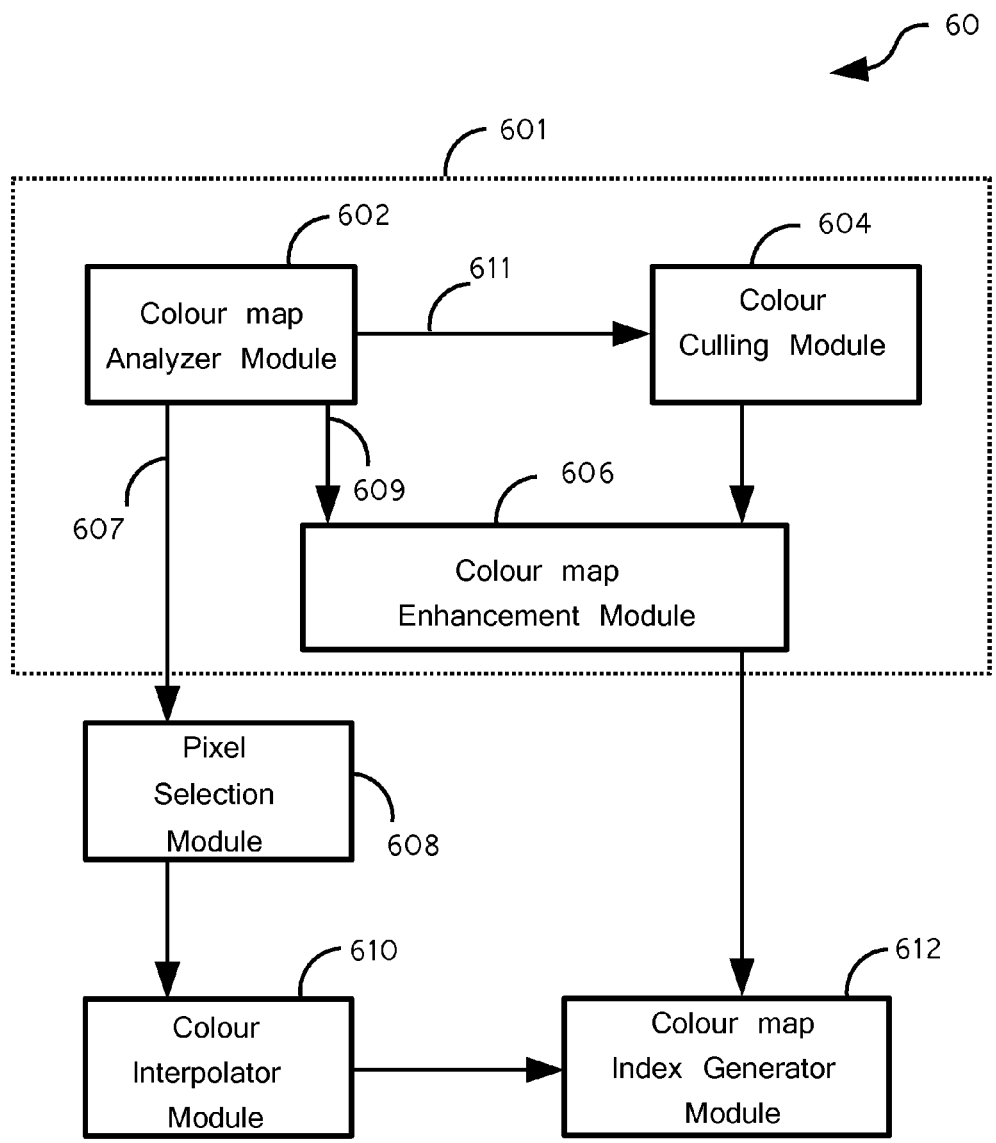
FIG. 6 shows a system for scaling a colour mapped image of the embodiment of the invention.

A schematic illustration of a system that implements the scaling method of the present invention is shown with the reference to FIG. 6.

FIG. 6 shows a diagram 60 illustrating a system for scaling a colour mapped image of the embodiment of the invention. It comprises a computer having a processor and computer readable medium, such as memory, having computer readable instructions stored thereon for execution by the processor to perform the steps of the method describe above, and to form modules 601-612, including various means for performing certain operations, of the system 60 as will be described in detail below.

The system 60 comprises a Colour Map Transformation Module 601, including a Colour Map Analyzer Module (CMA) 602, a Colour Culling Module 604, and a Colour Map Enhancement Module 606. The Colour Map Enhancement Module 606 comprises means for generating combinations of any two colours from the original colour map; and for each combination, interpolating between said two colours, the means for generating being implemented as a computer readable program code stored in a computer readable medium for execution by a processor.

The Colour Map Analyzer Module 602 determines the number of colours N used in the original colour map, excluding a transparent colour, as described above. The Colour Map Analyzer Module 602 is connected to a Pixel Selection Module 608, the Colour Map Enhancement Module 606, and the Colour Culling Module 604. The Colout Culling Module 604 comprises means for selecting a number of Colours $M_s$ as described above, and means for determining a colour usage vector indicating frequency of use of colours in the original colour map;

generating an octree graph based on the colour usage vector;
  parsing the octree graph to select $M_s$ colours to be included in the sub-set.
  Both means are implemented as a computer readable program code stored in a computer readable medium for execution by a processor.

Only one of the connections 607, 609 or 611 at a time is activated depending on the value of N. If the Colour Map Analyzer Module 602 determines that the number of colours is sufficiently large, i.e. $N > N_{max}$, then the original image colour map is inputted directly to the Pixel Selection Module 608. Otherwise, i.e. when $N < N_{max}$, the number of available colours is insufficient for maintaining an acceptable quality of the scaled image, and the original image colour map is inputted to the Colour Map Enhancement Module 606 either directly (if $N < N_{min}$) or through the Colour Culling Module 604 (if $N > N_{min}$) for the transformation of the original colour map. The purpose of the Colour Culling Module 604 is to reduce the number of colours available in the original colour map by trimming out colours that have little influence on the quality of the scaled image, but may considerably slow down the transformation to be performed by the Colour Map Enhancement Module 606. The reduction of colours is performed according to the steps 212, 110, 216, 218 and 220 of FIG. 2. As a result, the Colour Culling Module 604 provides the Colour Map Enhancement Module 606 with the set of colours that is most beneficial for performing the transformation.

Figure 2:
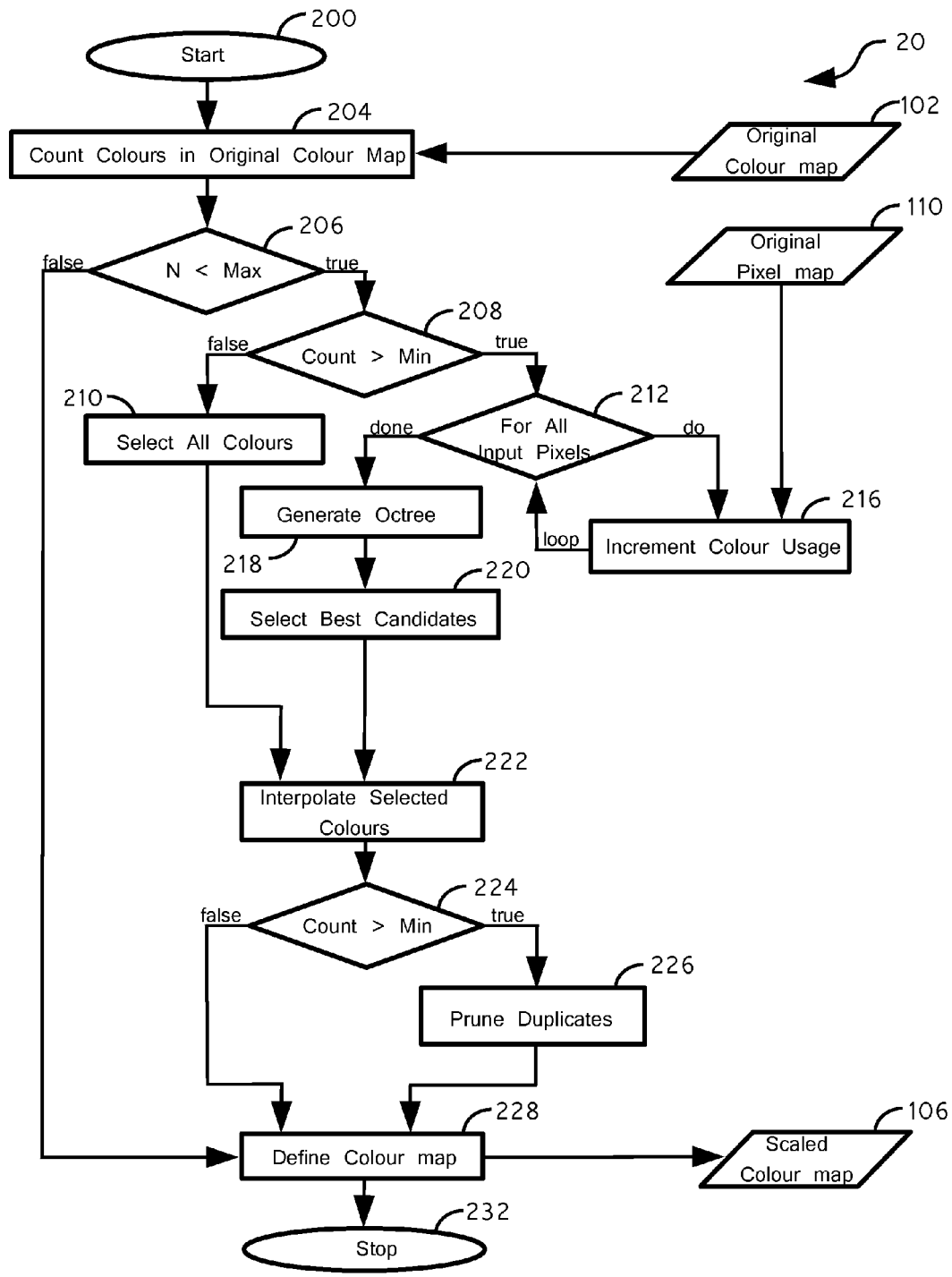
FIG. 2 shows the block 104 (Colour Map Transformation) of the method of FIG. 1 in more detail.

The transformation is performed by interpolating the set of colours according to steps 222, 224, and 226 of FIG. 2. The resulting enhanced colour map is considered to be a reasonably good approximation of the ideal colour map for the scaled image.

Pixel Selection Module 608 determines the selection of pixels of the original image that will be included in the scaled image according to the step 302 of FIG. 3 of the method described above.

Colour Interpolation Module 610 allows to determine RGB values of pixels in the selection, based on collecting and analyzing pixels of the original image contributing to each pixel in the selection, according to the steps of analyzing the list of contributing pixels as described with the reference to FIG. 5.

Colour Map Index Generation Module 612 takes, as its input, RGB values produced by the Colour interpolation Module 610 and colours available in the scaled colour map 106, compares them, picks the closest match and applies its index to the corresponding pixel.

Thus, an improved method and system for scaling a colour mapped image have been provided.

While the embodiments of the invention have been illustrated with reference to Graphical Interchange Format (GIF) images, its principles are also applicable to the scaling of digital images encoded with other formats, for example PNG (Portable Network Graphics), BMP (Bitmap), or other formats using colour maps. The system of the embodiments of the invention includes a general purpose or specialized computer having a CPU and a computer readable medium, e.g., memory, DVD, CD-ROM, storing computer readable instructions for executing the methods of the embodiments of the invention described above and forming various modules of the system shown in FIG. 6. Alternatively, the system of the embodiment of the invention can be implemented in firmware, or combination of firmware and a specialized computer.

The method for scaling a colour mapped image described above may be applicable to still images, or alternatively, it my be applicable to scaling images in a video stream. In the latter case, it would be beneficial to determine a delta region of the image, which has been changed compared to a previous video frame containing the image, and to perform the steps of the method only on the delta region, i.e., to use the delta region as the original image.

The computer readable medium, storing instructions thereon for performing the steps of the methods of the embodiments of the invention is also provided, comprising a memory, DVD, CD-ROM, floppy or other medium.

Although the invention has been described with respect to a preferred embodiment, it will be understood by those skilled in the art that the foregoing and various other changes, omissions and deviations in the form and detail thereof may be made without departing from the scope of the invention.

What is claimed is:

1. A method of scaling an original image, having an original colour map and original pixel map, into a scaled image having a scaled colour map and a scaled pixel map, implemented by a computing device having a processor, the method comprising:

(a) transforming the original colour map into the scaled colour map based on the original colour map and the original image independently of the scaled image, comprising:

provided $N_{min} < N < N_{max}$, wherein N is a number of colours in the original colour map, and $N_{min}$ and $N_{max}$ are respective predetermined minimum and maximum numbers of colours:

(a-i) selecting a sub-set $M_s$ of colours available in the original colour map, for colour enhancement, as follows:

$M_s = N$, provided $N(N+1) \leq 2N_{max}$; and $M_s = M$, where M is the smallest number M<N for which $M(M-1) \geq 2(N_{max} - N)$, provided $N(N+1) > 2N_{max}$;

(b) scaling the original image into the scaled image; and (c) for each pixel of the scaled image:

(c-i) determining a set of contributing pixels in the original image, which define a colour of the pixel;

(c-ii) determining the colour of the pixel based on colours of the contributing pixels and geometric proximity of the pixel to the contributing pixels;

(c-iii) establishing a correspondence between the colour of the pixel and a colour in the scaled colour map, and determining a corresponding colour map index thereof; and (c-iv) setting the determined colour map index in the scaled pixel map.

2. The method as described in claim 1, wherein the step (a) further comprises re-using the original colour map as the scaled colour map provided $N > N_{max}$.

3. The method as described in claim 1, wherein the step (a) further comprises:

(a-ii) increasing the number N of colours available in the original colour map to produce the scaled colour map provided $N < N_{min}$, wherein $N_{min}$ is a predetermined minimum number of colours.

4. The method as described in claim 3, wherein the step (a-ii) comprises:

generating combinations of any two colours from the original colour map;

for each combination, interpolating between said two colours.

5. The method as described in claim 1, wherein the step (a) further comprises:

(a-iii) increasing the number of colours for the selected sub-set of colours; and (a-iv) removing duplicate colours obtained in the step (a-iii).

6. The method as described in claim 5, wherein the step (a-iii) comprises:

generating combinations of any two colours from the sub-set of colours; and for each combination, interpolating between said two colours.

7. The method as described in claim 1, wherein the step (a-i) further comprises:

determining a colour usage vector indicating frequency of use of colours in the original colour map;

generating an octree graph based on the colour usage vector; and parsing the octree graph to select $M_s$ colours to be included in the sub-set.

8. A method for scaling an image in a video stream, implemented by a computing device having a processor, the method comprising:
   selecting a video frame comprising an image;
   determining a delta region of the image, which has been changed compared to a previous video frame; and
   performing the steps of the method of claim 1, wherein the original image is the delta region.

9. The method as described in claim 1, wherein the step (c-ii) comprises one of the following:
   assigning the colour of the pixel equal to the colours of the contributing pixels provided the colours of the contributing pixels are the same; or
   assigning the colour of the pixel by interpolating colours between the contributing pixels.

10. The method as described in claim 9, wherein the interpolating colours between the contributing pixels comprises bi-linear interpolating.

11. The method as described in claim 10, wherein:
   the step (c-i) comprises determining first ($Q_{11}$), second ($Q_{12}$), third ($Q_{21}$) and fourth ($Q_{22}$) contributing pixels located in vertices of a rectangle surrounding the pixel ($P_1$) and having respective colours f($Q_{11}$), f($Q_{12}$), f($Q_{21}$) and f($Q_{22}$); and
   the step (c-ii) comprises determining the colour f($P_1$) of the pixel ($P_1$) as follows:

$$f(P_1)=f(Q_{11})(x_2-x)/(x_2-x_1)+f(Q_{21})(x-x_1)/(x_2-x_1)$$

provided f($Q_{11}$) =f($Q_{12}$) and f($Q_{21}$) =f($Q_{22}$) and wherein x is a horizontal coordinate of the pixel $P_1$, $x_1$ is a horizontal coordinate of the pixels $Q_{11}$ and $Q_{12}$, and $x_2$ is a horizontal coordinate of the pixels $Q_{21}$ and $Q_{22}$.

12. The method as described in claim 10, wherein:
   the step (c-i) comprises determining first ($Q_{11}$), second ($Q_{12}$), third ($Q_{21}$) and fourth ($Q_{22}$) contributing pixels located in vertices of a rectangle surrounding the pixel (Q) and having respective colours f($Q_{11}$), f($Q_{12}$), f($Q_{21}$) and f($Q_{22}$); and
   the step (c-ii) comprises determining the colour f(Q) of the pixel ($P_1$) as follows:

$$f(P_1)=f(Q_{11})(y_2-y)/(y_2-y_1)+f(Q_{12})(y-y_1)/(y_2-y_1)$$

provided f($Q_{11}$) =f($Q_{21}$) and f($Q_{12}$) = f($Q_{22}$) and wherein y is a horizontal coordinate of the pixel $P_1$, $y_1$ is a horizontal coordinate of the pixels $Q_{11}$ and $Q_{21}$, and $y_2$ is a horizontal coordinate of the pixels $Q_{12}$ and $Q_{22}$.

13. The method as described in claim 1, wherein the step (c-iii) comprises finding the closest match in the scaled colour map.

14. The method as described in claim 1, wherein the original and scaled images are selected from Graphical Interchange Format (GIF), Portable Network Graphic (PNG), and Bitmap (BMP) images.

15. A system for scaling an original image, having an original colour map and original pixel map, into a scaled image having a scaled colour map and a scaled pixel map, the system comprising:
   a computer having a processor and non-transitory computer readable storage medium having computer readable instructions stored thereon for execution by the processor, forming:
   a colour map transformation module for transforming the original colour map into the scaled colour map based on the original colour map and the original image independently of the scaled image, comprising:
      a colour culling module for selecting a sub-set $M_s$ of colors available in the original color map, for colour enhancement, as follows:
   provided $N_{min}$ <N<$N_{max}$, wherein N is a number of colours in the original colour map, and $N_{min}$ and $N_{max}$ are respective predetermined minimum and maximum numbers of colours:
   $M_s$ =N, provided N(N+1)$\leq$2$N_{max}$; and
   $M_s$ =M, where M is the smallest number M<N for which M(M−1)$\geq$2($N_{max}$−N), provided N(N+1)>2$N_{max}$;
   a pixel selection module for scaling the original image into the scaled image;
   a colour interpolation module for determining, for each pixel of the scaled image:
      a set of contributing pixels in the original image, which define a colour of the pixel; and
      the colour of the pixel based on colours of the contributing pixels and geometric proximity of the pixel to the contributing pixels; and
   a colour map index generation module for:
      establishing a correspondence between the colour of the pixel and a colour in the scaled colour map, determining a corresponding colour map index thereof, and setting the determined colour map index in the scaled pixel map.

16. The system as described in claim 15, wherein the colour map transformation module further comprises a colour map enhancement module for increasing the number of colours available in the original colour map to produce the scaled colour map provided N<$N_{min}$, and for increasing the number of colours in the selected sub-set of colours provided $N_{min}$ <N<$N_{max}$, and for removing duplicate colours.

17. The system as described in claim 16, wherein the colour map enhancement module is configured to generate combinations of any two colours from the original colour map; and for each combination, interpolate between said two colours.

18. The system as described in claim 15, wherein the colour culling module is further configured to:
   determine a colour usage vector indicating frequency of use of colours in the original colour map;
   generate an octree graph based on the colour useage vector;
   parse the octree graph to select Ms colours to be included in the sub-set.

19. A non-transitory computer readable storage medium having computer readable instructions stored thereon for execution by a processor causing the processor to:
   (a) transform the original colour map into the scaled colour map based on the original colour map and the original image independently of the scaled image, comprising:
      provided $N_{min}$ <N<$N_{max}$, wherein N is a number of colours in the original colour map and $N_{min}$ and $N_{max}$ are respective predetermined minimum and maximum numbers of colours:
      (a-i) selecting a sub-set $M_s$ of colours available in the original colour map, for colour enhancement, as follows:
      $M_s$=N, provided N(N+1)2$N_{max}$; and
      $M_s$=M where M is the smallest number M<N for which M(M−1)$\geq$2 ($N_{max}$−N), provided N(N+1 )>2$N_{max}$;
   (b) scale the original image into the scaled image; and
   (c) for each pixel of the scaled image:
      (c-i) determine a set of contributing pixels in the original image, which define a colour of the pixel;
      (c-ii) determine the colour of the pixel based on colours of the contributing pixels and geometric proximity of the pixel to the contributing pixels;

(c-iii) establish a correspondence between the colour of the pixel and a colour in the scaled colour map, and determine a corresponding colour map index thereof; and (c-iv) set the determined colour map index in the scaled pixel map.

20. A method for transforming an original colour map of an original image into a scaled colour map of a scaled image, implemented by a computing device having a processor, the method comprising:

selecting a sub-set $M_s$ of colours available in the original colour map, for colour enhancement, as follows:

provided $N_{min} < N < N_{max}$, wherein N is a number of colours in the original colour map, and $N_{min}$ and $N_{max}$ are respective predetermined minimum and maximum numbers of colours:

$M_s = N$, provided $N(N+1) \leqq 2N_{max}$; and $M_s = M$, where M is the smallest number M<N for which $M(M-1) \geqq 2(N_{max} - N)$, provided $N(N+1) > 2N_{max}$.

21. The method as described in claim 20, further comprising re-using the original colour map as the scaled colour map provided $N > N_{max}$.

22. The method as described in claim 20, further comprising increasing the number N of colours available in the original colour map to produce the scaled colour map provided $N < N_{min}$.

23. The method as described in claim 20, further comprising:

increasing the number of colours for the selected sub-set of colours; and removing duplicate colours obtained in said step of increasing provided $N_{min} < N < N_{max}$.

24. A system for transforming an original colour map of an original image into a scaled colour map of a scaled image, comprising:

a computer having a processor and a non-transitory computer readable storage medium having computer readable instructions stored thereon, forming:

a colour map transformation module, selecting a sub-set $M_s$ of colours available in the original colour map, for colour enhancement, as follows:

provided $N_{min} < N < N_{max}$, wherein N is a number of colours in the original colour map, and $N_{min}$ and $N_{max}$ are respective predetermined minimum and maximum numbers of colours:

$M_s = N$, provided $N(N+1) \leqq 2N_{max}$; and $M_s = M$, where M is the smallest number M<N for which $M(M-1) \geqq 2(N_{max} - N)$, provided $N(N+1) > 2N_{max}$.

25. The system as described in claim 24, wherein the colour map transformation module further comprises a colour map enhancement module for increasing the number of colours available in the original colour map to produce the scaled colour map provided $N < N_{min}$, and for increasing the number of colours in the selected sub-set of colours provided $N_{min} < N < N_{max}$, and for removing duplicate colours.

* * * * *

UNITED STATES PATENT AND TRADEMARK OFFICE
CERTIFICATE OF CORRECTION

PATENT NO. : 8,107,724 B2
APPLICATION NO. : 12/185081
DATED : January 31, 2012
INVENTOR(S) : Simon Descarries It is certified that error appears in the above-identified patent and that said Letters Patent is hereby corrected as shown below:

Column 14, line 12, "N(N+1 )" should read --N(N+1)--.

Column 14, line 35, "wherein N $_{min}$" should read as --wherein N$_{min}$--.

Column 15, line 30, "the pixel P$_l$, x$_l$is" should read as --the pixel P$_l$, x$_l$ is--.

Column 16, line 42, "Ms" should read as --M$_s$--.

Column 16, line 51, "colour map and N$_{min}$ and M$_{max}$--" should read as --colour map, and N$_{min}$ and N$_{max}$--.

Column 16, line 57, "N(N+1)2N$_{max}$" should read as --N(N+1)$\leq$2N$_{max}$--.

Column 18, line 58, "M$_s$=M where" should read as --M$_s$=M, where--.

Column 18, line 59, "N(N+1 )>" should read as --N(N+1)>--.

Column 17, line 19, "M(M--1)$\geq$2(N$_{max}$--N)" should read as --M(M-1)$\geq$2(N$_{max}$-N)--.

Column 18, line 18, "M$_s$=N," should read as --M$_s$=N,--.

Column 18, line 19, "M$_s$=M," should read as -- M$_s$=M,--.

Signed and Sealed this
Twenty-eighth Day of August, 2012

David J. Kappos
*Director of the United States Patent and Trademark Office*